United States Patent
Höglund et al.

(10) Patent No.: US 11,166,224 B2
(45) Date of Patent: Nov. 2, 2021

(54) SELECTIVE SYSTEM INFORMATION DENSIFICATION

(71) Applicant: Telefonaktiebolaget LM Ericsson (publ), Stockholm (SE)

(72) Inventors: Andreas Höglund, Solna (SE); Johan Bergman, Stockholm (SE); Antti Ratilainen, Espoo (FI); Tuomas Tirronen, Helsinki (FI); Emre Yavuz, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/612,240

(22) PCT Filed: May 3, 2018

(86) PCT No.: PCT/SE2018/050463
§ 371 (c)(1),
(2) Date: Nov. 8, 2019

(87) PCT Pub. No.: WO2018/208209
PCT Pub. Date: Nov. 15, 2018

(65) Prior Publication Data
US 2020/0322875 A1 Oct. 8, 2020

Related U.S. Application Data

(60) Provisional application No. 62/505,492, filed on May 12, 2017.

(51) Int. Cl.
*H04W 68/00* (2009.01)
*H04W 48/12* (2009.01)

(52) U.S. Cl.
CPC ........... *H04W 48/12* (2013.01); *H04W 68/00* (2013.01)

(58) Field of Classification Search
CPC ....... H04W 48/12; H04W 68/00; H04W 4/70; H04W 16/26; H04W 24/02; H04W 48/10;
(Continued)

(56) References Cited

U.S. PATENT DOCUMENTS

2004/0263689 A1* 12/2004 Tanaka ................. H04N 21/242
348/563
2015/0264511 A1* 9/2015 Rashid ................. H04W 48/12
370/329
(Continued)

FOREIGN PATENT DOCUMENTS

EP 3082366 A1 10/2016
WO 2013183966 A1 12/2013

OTHER PUBLICATIONS

3GPp, "3rd Generation Partnership Project; Technical Specification Group Radio Access Network; Evolved Universal Terrestrial Radio Access (E-UTRA); Physical layer procedures (Release 13) The present", 3GPP TS 36.213 V13.5.0, Mar. 2017, pp. 1-375.
(Continued)

*Primary Examiner* — Nathan S Taylor
(74) *Attorney, Agent, or Firm* — Sage Patent Group (57) ABSTRACT

A method, performed by a network node (e.g., an eNB) is provided. The method includes, during a first time period, broadcasting system information (SI) at a first density (e.g., frequency); and determining that a condition is satisfied. The method further includes, as a result of determining that the condition is satisfied, broadcasting the SI at a second density (e.g., frequency) during a subsequent second time period. The second density is greater than the first density.

15 Claims, 9 Drawing Sheets

(58) Field of Classification Search
CPC ........... H04W 52/0229; H04W 56/001; H04W 74/006; H04W 8/245; H04W 76/14; H04W 16/00; H04W 4/005; H04W 76/023; H04W 4/00; H04W 16/08; H04W 72/04; H04W 16/32; H04W 28/06; H04W 48/16; H04W 72/12; H04W 74/00; H04W 76/02; H04W 8/24; H04W 56/00; H04W 4/04; H04W 52/02; H04L 5/0035; H04L 5/0053; H04L 5/0023; H04L 5/0069; H04L 5/0091; H04L 5/00
USPC ........................................... 455/419; 370/329
See application file for complete search history.

(56) References Cited

U.S. PATENT DOCUMENTS

| | | | | |
|---|---|---|---|---|
| 2015/0312887 | A1* | 10/2015 | Xia | H04W 72/005 370/329 |
| 2015/0327155 | A1* | 11/2015 | Lee | H04W 48/12 370/329 |
| 2016/0212636 | A1* | 7/2016 | Dimou | H04W 48/10 |
| 2017/0311290 | A1* | 10/2017 | Adjakple | H04W 76/18 |
| 2017/0325049 | A1* | 11/2017 | Basu Mallick | H04W 48/12 |
| 2018/0049022 | A1* | 2/2018 | Johansson | H04W 8/24 |
| 2018/0049107 | A1* | 2/2018 | Johansson | H04W 48/10 |
| 2018/0160404 | A1* | 6/2018 | Im | H04L 25/0204 |
| 2018/0199267 | A1* | 7/2018 | Lin | H04W 48/10 |
| 2018/0279377 | A1* | 9/2018 | Lin | H04W 74/0833 |
| 2019/0097718 | A1* | 3/2019 | Huang | H04W 48/16 |
| 2019/0335221 | A1* | 10/2019 | Walker | H04L 69/324 |
| 2020/0015098 | A1* | 1/2020 | Mallick | H04L 5/0091 |

OTHER PUBLICATIONS

3GPp, "3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331 V13.5.0, Mar. 2017, pp. 1-134.

Unknown, Author, "New WID on Even further enhanced MTC for LTE", 3GPP TSG RAN Meeting #75 RP-170732; Dubrovnik, Croatia; (revision of RP-170465), Mar. 6-9, 2017, pp. 1-4.

Unknown, Author, "New WID on Further NB-IoT enhancements", #3GPP TSG RAN Meeting #75, RP-170852, Dubrovnik, Croatia, Mar. 6-9, 2017, pp. 1-6.

Unknown, Author, "PBCH coverage extension for MTC devices", 3GPP TSG.RAN WG1 Meeting #72bis, R1-130938, Chicago, USA, Apr. 15-19, 2013, pp. 1-4.

* cited by examiner

SELECTIVE SYSTEM INFORMATION DENSIFICATION

TECHNICAL FIELD

Disclosed are embodiments related to reducing system acquisition time by a user equipment (UE) and system overhead, in particular by providing a selectively denser system information broadcast.

BACKGROUND

There has been a lot of work in 3GPP lately on specifying technologies to cover Machine-to-Machine (M2M) and/or Internet of Things (IoT) related use cases. Most recent work for 3GPP Release 13 and 14 includes enhancements to support Machine-Type Communications (MTC) with a new UE categories (Cat-M1, Cat-M2), supporting reduced bandwidth of up to 6 physical resource blocks (PRBs), and Narrowband IoT (NB-IoT) UEs providing a new radio interface (and UE categories, Cat-NB1 and Cat-NB2).

We will refer to the LTE enhancements introduced in 3GPP Release 13, 14 and 15 for MTC as "eMTC", including (not limiting) support for bandwidth limited UEs, Cat-M1, and support for coverage enhancements. This is to separate discussion from NB-IoT (notation here used for any Release), although the supported features are similar on a general level.

There are multiple differences between regular LTE and the procedures and channels defined for eMTC (likewise for NB-IoT). Some important differences include new physical channels, such as the physical downlink control channels, called MPDCCH in eMTC and NPDCCH in NB-IoT, and a new physical random access channel, NPRACH, for NB-IoT. For system information (SI) (both eMTC and NB-IoT) there is no dynamic scheduling of either SIB1-BR/SIB1-NB (scheduling information included in MIB/MIB-NB), or SI messages (fixed scheduling inside an SI window provided in SIB1-BR/SIB1-NB). Both eMTC and NB-IoT support coverage enhancements and the UE may have to accumulate several repetitions of SI broadcast in order to be able to successfully decode it. This means that SI acquisition time will in practice be longer the worse coverage the UE is in. In order to combat this, more dense repetitions for some physical channels and SI was introduced in eMTC and NB-IoT Release 13. The system acquisition procedure is in general the same for eMTC and NB-IoT as for LTE; The UE first achieves downlink synchronization by reading PSS/SSS, then it reads MIB, then SIB1, and last the SI-messages are acquired (each possibly containing multiple SIBs).

For eMTC and NB-IoT UEs, the SI is considered to be invalid 24 hours after it was successfully considered to be valid. For "normal" UEs the SI is considered to be invalid after 3 hours. It is also possible to configure eMTC and NB-IoT to use the 3 hours validity range by using parameter si-ValidityTime [TS 36.331].

During Release 14 some problems related to long SI acquisition time were identified by RAN4. Reducing the system acquisition time is also one of the agreed work item objectives for Release 15, which is common to both eMTC and NB-IoT:

New WID on Even further enhanced MTC for LTE (RP-170732):
Improved latency:
Reduced system acquisition time [RAN1 lead, RAN2, RAN4]
Improved cell search and/or system information (including MIB and SIB1-BR) acquisition performance
New WID on Further NB-IoT enhancements (RP-170852):
Reduced system acquisition time [RAN1 lead, RAN2, RAN4]
Improved cell search and/or system information (at least MIB-NB) acquisition performance, for all operation modes
"Reduced system acquisition time [RAN1 lead, RAN2, RAN4]
Improved cell search and/or system information (at least MIB-NB) acquisition performance, for all operation modes"

SUMMARY

One solution to improving SI acquisition latency is to have denser SI broadcast. However, this will lead to increased system overhead, and this is in many cases not an acceptable solution. For example, for Release 13 NB-IoT the system overhead can already consume above 50% of the downlink resources for some configurations and it is rarely below 30%.

Embodiments described herein provide denser SI broadcast, e.g. more transmissions per time unit, during selected periods when the SI is likely to be read by many UEs in the cell, for example upon SI update and hence following a SI change notification.

An advantage is that this provides reduced SI acquisition time. Additionally, embodiments can achieve this result without any increase in system overhead or without a significant increase. In fact, the SI broadcast could potentially even be made less dense for most of the time, thereby decreasing the system overhead.

BRIEF DESCRIPTION OF THE DRAWINGS

The accompanying drawings, which are incorporated herein and form part of the specification, illustrate various embodiments.

DETAILED DESCRIPTION

Figure 4A:
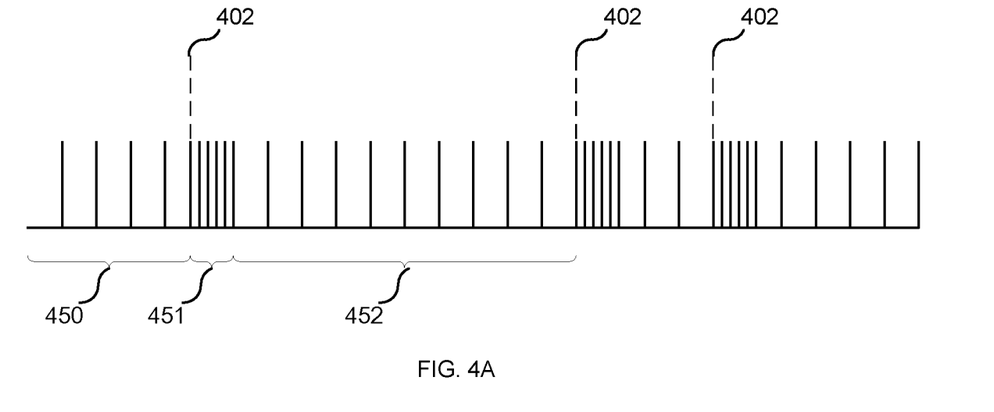
FIG. 4A illustrates a denser broadcast of SI according to some embodiments.

An advantage of some embodiments of the present invention is to selectively have denser repetition of SI during periods of time in which the SI is assumed (or known) to be read by many UEs in the cell (e.g. a high enough number of UEs to make broadcast more effective than unicast transmission to each UE). This is schematically illustrated in FIG. 4A. An example for this would be upon SI update, the new SI will then have to be read by all UEs. In other cases, a single UE will typically acquire the SI, i.e. upon initial access, SI re-acquisition, handover, or RRC connection re-establishment. However, for machine type devices, groups of devices could act like an entity and some of these cases could still be relevant. For example, the 3 h or 24 h validity time could expire at the same time (or approximately the same time) for a group of UEs upon which the network would provide denser repetitions.

In this context, SI includes any of the following: synchronization signals (PSS/SSS for eMTC, NPSS/NSSS for NB-IoT), MIB/MIB-NB, SIB1-BR/SIB1-NB, or SI-messages.

From the solutions for UE power consumption reduction, i.e. power-saving mode (PSM) or extended DRX (eDRX), there could also be multiple UEs waking up and attempting to read SI at the same time (or approximately the same time). The network, or more specifically the eNB, could at those occasions provide denser SI broadcast. E.g. UEs configured to have the same paging frame for eDRX would wake up, read synchronization channels, then read MIB/MIB-NB upon every eDRX cycle before they can monitor the paging in their respective paging occasion. As core network (MME) manages paging of the UEs in the system and provides settings for PSM and eDRX, in one embodiment the MME (or some other core network node) and the eNB coordinate eDRX cycles and/or PSM settings so that the eNB(s) can time the denser SI broadcast accordingly. This coordination could be done using standardized signaling over the S1 interface. In one alternative such signaling is proprietary and not standardized.

Figure 4B:
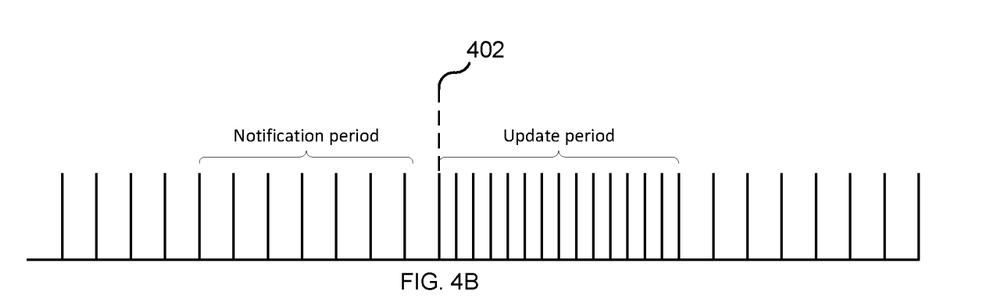
FIG. 4B illustrates a denser broadcast of SI according to some embodiments.
Figure 4C:
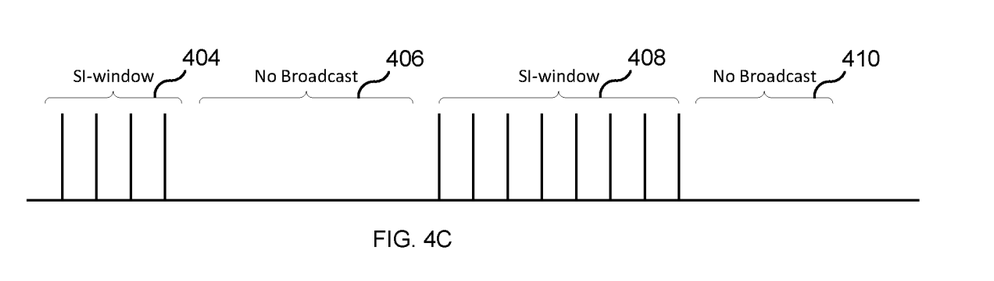
FIG. 4C illustrates a denser broadcast of SI according to some embodiments.

When SI is updated, the network first notifies the UEs in the cell about the upcoming SI change. This is done by paging all the UEs during one BCCH modification period and including systemInfoModification in the paging message which indicates that the SI will be updated at the next BCCH modification period boundary (refer to section 5.2.1.3 in 3GPP TS 36.331 for further details). In embodiments of the present invention, the eNB may then after this next BCCH modification period boundary provide denser repetition for some or all of the SI for a period of time before going back to the regular SI broadcast. This is illustrated in FIGS. 4B and 4C and the flowchart in FIG. 5.

In general, the length of the period with denser SI broadcast (or the number of additional repetitions) could be a function of the coverage enhancement supported by the cell and/or the longest acceptable SI acquisition or access latency.

In some situations, it is advantageous to make the UEs aware of this feature and this could be indicated e.g. in SI. That is, an indication could be included which lets the UE to know e.g. the pre-configured denser SI pattern, additional repetitions, etc. and when they are transmitted by the network (e.g. upon SI update or prior to eDRX). The denser configuration could either be a Release 13 configuration as exemplified below.

The following table from 3GPP TS 36.213 exemplifies how the UE could be made aware of the denser configuration:

(3GPP TS 36.213 Table 7.1.6-1: Number of repetitions for PDSCH carrying SystemInformationBlockType1-BR for BL/CE UE.)

| Value of schedulingInfoSIB1-BR-r13 | Number of PDSCH repetitions |
| --- | --- |
| 0 | N/A |
| 1 | 4 |
| 2 | 8 |
| 3 | 16 |
| 4 | 4 |
| 5 | 8 |
| 6 | 16 |
| 7 | 4 |
| 8 | 8 |
| 9 | 16 |
| 10 | 4 |
| 11 | 8 |
| 12 | 16 |
| 13 | 4 |
| 14 | 8 |
| 15 | 16 |
| 16 | 4 |
| 17 | 8 |
| 18 | 16 |
| 19-31 | Reserved |

Where, for example, the less dense SIB1-BR broadcast could be configured with 4 repetitions and the more dense SIB1-BR broadcast with 16 (3GPP TS 36.213).

The SI-messages could be configured to be transmitted in e.g. every radio frame during the SI windows during the 'dense SI periods' instead of in every 8th radio frame. For example, the SystemInfromationBlockType1 message from 3GPP TS 36.213 includes a field for si-RepetitionPattern-r13, having possible values of "everyRF," "every2ndRF," "every4thRF," and "every8thRF," as shown below:

```
-- ASN1START
SystemInformationBlockType1-BR-r13 ::= SystemInformationBlockType1
:
:
SystemInformationBlockType1-v1310-IEs ::= SEQUENCE {
    hyperSFN-r13                        BIT STRING (SIZE (10))      OPTIONAL,    -- Need OR
    eDRX-Allowed-r13                    ENUMERATED {true}           OPTIONAL,    -- Need OR
    cellSelectionInfoCE-r13             CellSelectionInfoCE-r13     OPTIONAL,    -- Need OP
    bandwidthReducedAccessRelatedInfo-r13   SEQUENCE {
        si-WindowLength-BR-r13              ENUMERATED {
                                            ms20, ms40, ms60, ms80, ms120,
                                            ms160, ms200, spare},
        si-RepetitionPattern-r13            ENUMERATED {everyRF, every2ndRF,
everу4thRF,
```

|  |  |  |  |
|---|---|---|---|
|  | every8thRF}, |  |  |
| schedulingInfoList-BR-r13 | SchedulingInfoList-BR-r13 | OPTIONAL, | -- Need OR |
| fdd-DownlinkOrTddSubframeBitmapBR-r13 | CHOICE { |  |  |
| subframePattern10-r13 | BIT STRING (SIZE (10)), |  |  |
| subframePattern40-r13 | BIT STRING (SIZE (40)) |  |  |
| } | OPTIONAL, | -- Need OP |  |
| fdd-UplinkSubframeBitmapBR-r13 | BIT STRING (SIZE (10)) | OPTIONAL, | - Need OP |
| startSymbolBR-r13 | INTEGER (1..4), |  |  |
| si-HoppingConfigCommon-r13 | ENUMERATED {on,off}, |  |  |
| si-ValidityTime-r13 | ENUMERATED {true} OPTIONAL, |  | -- Need OP |
| systemInfoValueTagList-r13 | SystemInfoValueTagList-r13 | OPTIONAL | -- Need OR |
| } | OPTIONAL, | -- Cond BW-reduced |  |
| nonCriticalExtension | SystemInformationBlockType1-v1320-IEs |  |  |
| OPTIONAL |  |  |  |
| } |  |  |  |
| : |  |  |  |
| : |  |  |  |
| (3GPP TS 36.213 SystemInformationBlockType1 message.) |  |  |  |

Alternatively, instead of using si-RepetitionPattern-r13 from Release 13, a new configuration with more dense repetitions could be introduced in e.g. Release 15 (for PSS/SSS etc.)

In another embodiment the SI is not a densified version of an existing SIB but a new SIB which is transmitted frequently after an SI update notification but seldom (or not at all) otherwise.

The above is exemplified in the case of eMTC and NB-IoT but would be generally applicable to any other radio access technology.

Figure 1:
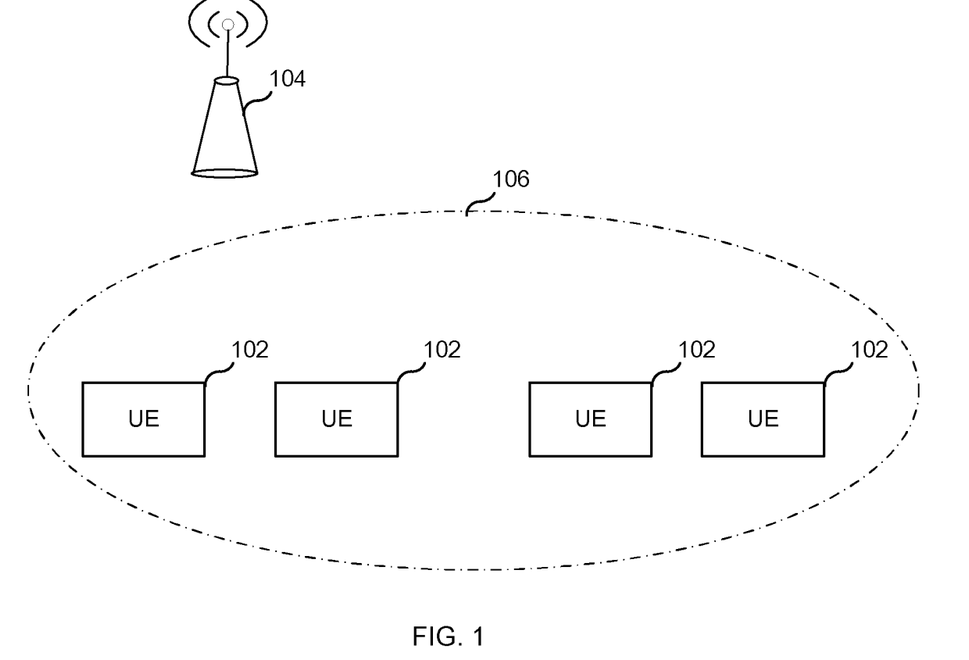
FIG. 1 illustrates a network architecture according to some embodiments.

As shown in FIG. 1, one or more UEs 102 are in a cell served by a network node 104 (e.g., an eNB). The UEs 102 may be part of a group 106. For example, the UEs in group 106 may support Machine-Type Communications, and may be configured to wake up at the same or approximately the same time as each other.

Figure 2:
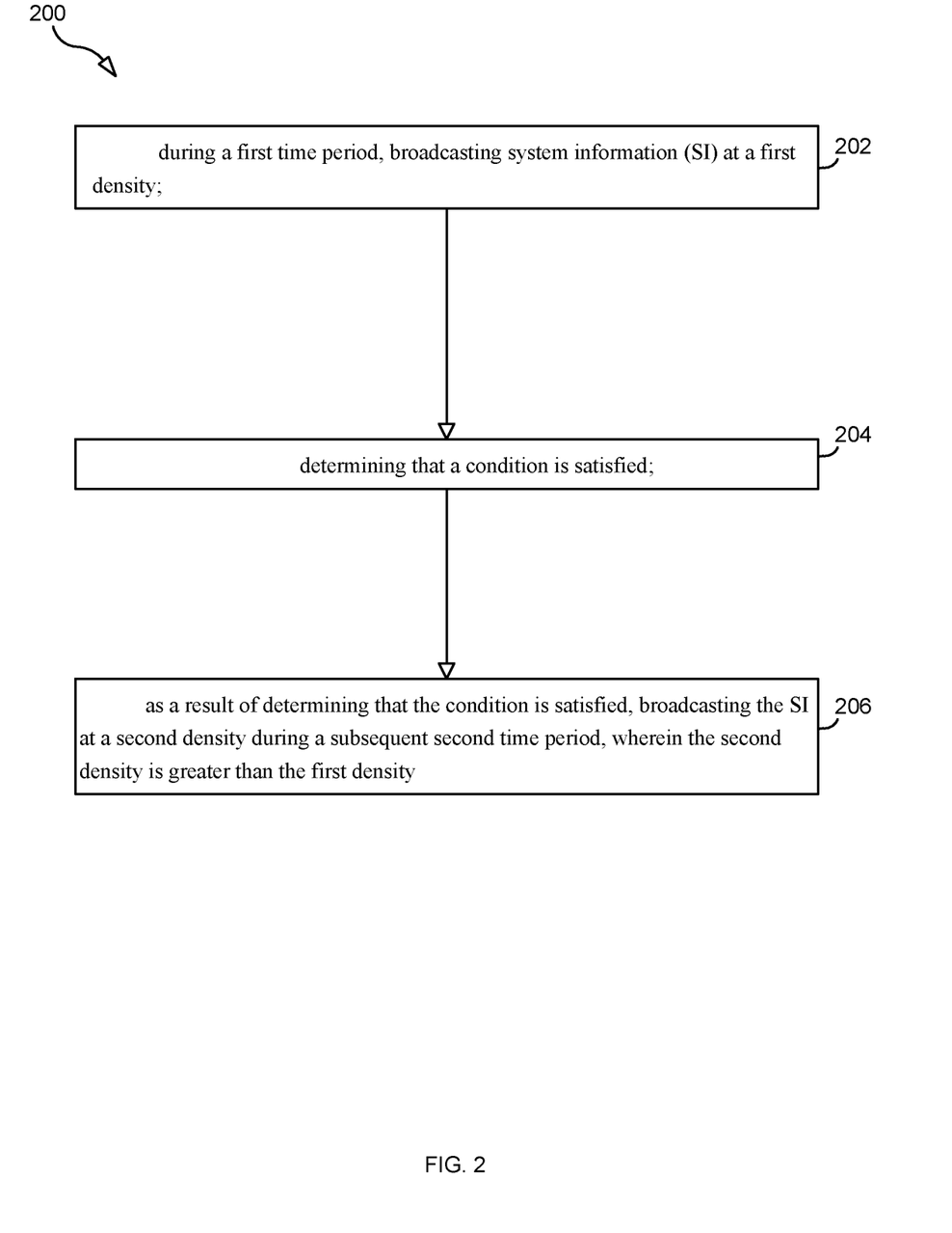
FIG. 2 is a flow chart illustrating a process according to some embodiments.

FIG. 2 illustrates process 200, which may be performed by a network node such as network node 104. Network node 104 may, during a first time period (e.g., period 450, see FIG. 4A), broadcast SI at a first density (step 202). Network node 104 may determine that a condition is satisfied (step 204). Network node 104 may, as a result of determining that the condition is satisfied, broadcast the SI at a second density during a subsequent second time period (e.g., period 451) (step 206). The second density is greater than the first density. Density may refer to the frequency that the SI is broadcast. For instance, density may measure the number of broadcasts over a given time period, and a higher density may mean that there are more frequent broadcasts.

In some embodiments, the second time period is shorter than the first. In some embodiments, the method further includes determining a number of user equipments (UEs) that are assumed to (or may or are likely to) read the broadcast SI during the second time period. In some embodiments, determining that the condition is satisfied may include determining that the determined number of UEs meets or exceeds a threshold. In some embodiments, determining that the condition is satisfied includes determining that there is (or has recently been) a SI update (e.g., SI change notification in the preceding BCCH modification period); and/or determining that a validity time for a group of UEs will expire during (or immediately before) the second time period; and/or determining if a BCCH modification period is subsequent to a SI change notification period.

In some embodiments, the method further includes notifying UEs in a cell served by the network node about a change in the SI. In some embodiments, notifying UEs about the change in the SI includes paging the UEs during one BCCH modification period and including a system modification indicator in the paging message indicating that the SI will be updated at the next BCCH modification period boundary. In some embodiments, the second time period begins at or after the next BCCH modification period boundary.

In some embodiments, a length of the second time period is a function of the coverage enhancement supported by a cell served by the network node and/or the longest acceptable SI acquisition or access latency. In some embodiments, broadcasting the SI at the first density during the first time period includes transmitting the SI not more than X times (e.g. 4 times) during the first time period, the length of the first time period is t1 seconds, broadcasting the SI at the second density during the second time period comprises transmitting the SI at least Y times (e.g. 8 times) during the second time period, the length of the second time period is t2 seconds, and Y/t2 is greater than X/t1.

In some embodiments, the method further includes transmitting a SI block (SIB) comprising information indicating one or more of the second density, a duration of the second time period, and the condition to be satisfied. In some embodiments, the second time period comprises a plurality of radio frames, and the information included in the SIB indicates that during the second time period the SI is transmitted once in every nth one of the plurality of radio frames, wherein n is one of 1, 2, 4, 8, and 16. In some embodiments, the method further includes transmitting the SI in a first SI block (SIB) during the first time period; and transmitting the SI in a second SIB during the second time period.

Figure 3:
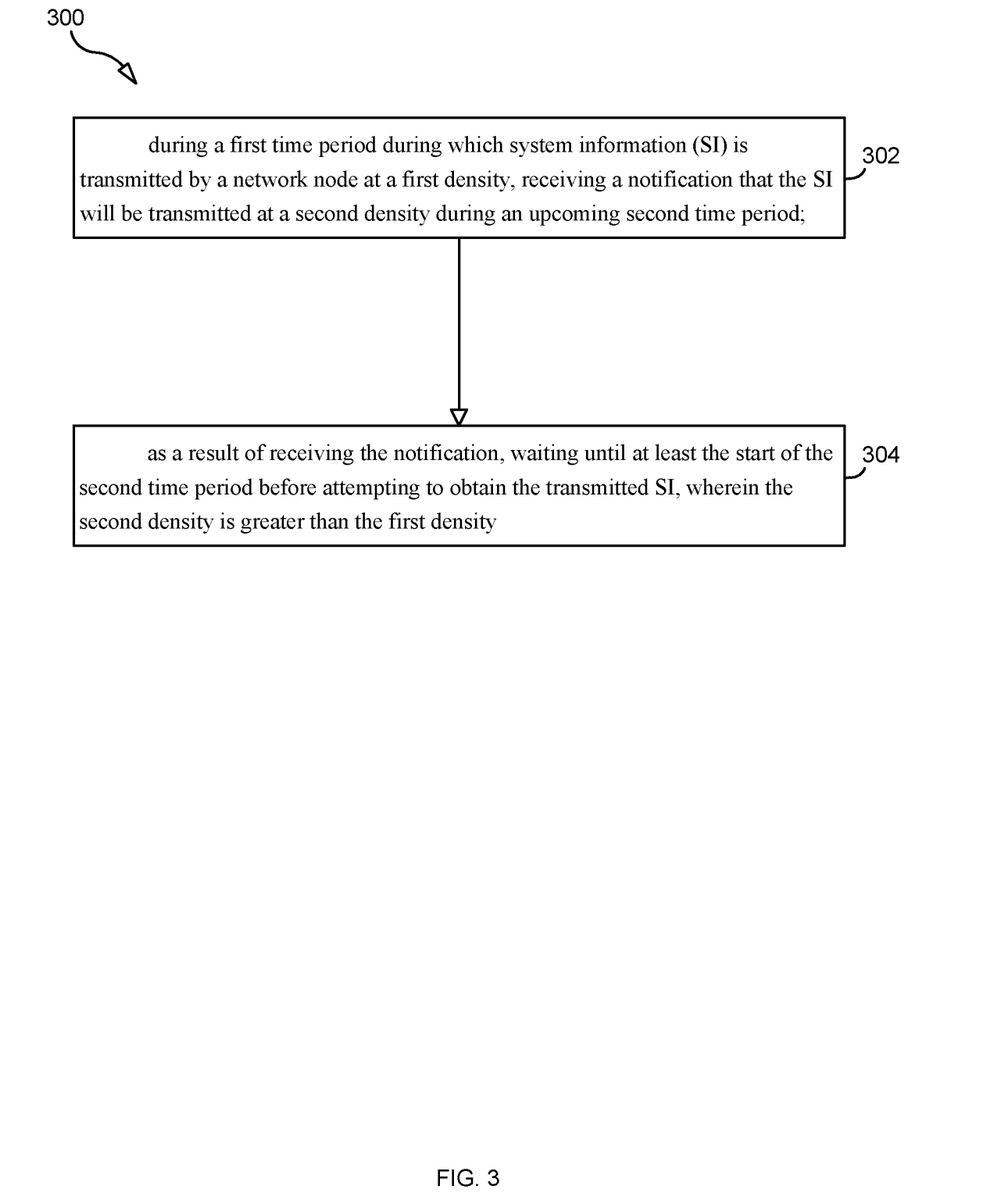
FIG. 3 is a flow chart illustrating a process according to some embodiments.

FIG. 3 illustrates a process 300, which may be performed by a UE such as UE 102. UE 102 may, during a first time period during which SI is transmitted by a network node at a first density, receive a notification that the SI will be transmitted at a second density during an upcoming second time period (step 302). UE 102 may, as a result of receiving the notification, wait until at least the start of the second time period before attempting to obtain the transmitted SI (step 304). The second density is greater than the first density.

FIGS. 4A-4C illustrate schematically the broadcasting of SI at different densities. For example, in FIG. 4A, when it is determined at certain points 402 that denser broadcast is needed or useful, SI is selectively broadcast more dense for a duration (e.g. period 451) before returning back to the less dense broadcast (e.g. period 452). Likewise, in FIG. 4B, which illustrates denser SI broadcast with more repetitions in the BCCH modification period in which UEs should update SI ('Update period') following the BCCH modification period during which UEs are notified about the upcoming SI update in paging ('Notification period'). As FIGS. 4A and 4B illustrate, one way to achieve a denser broadcast is to have a higher frequency or repetition rate. FIG. 4C illustrates another way to achieve higher density. SI is broadcast during the broadcast windows (or SI-windows) 404, 408, but not during the no broadcast regions 406, 410. By increasing the broadcast window (or SI-window), the density can be increased even though the SI is transmitted with the same periodicity. For example, compare broadcast window (SI-window) 404 (lower density) to window 408 (higher density). As shown, window 408 is longer than window 404. Also, in the example shown, the SI is transmitted with the same spacing between transmissions.

Figure 5:
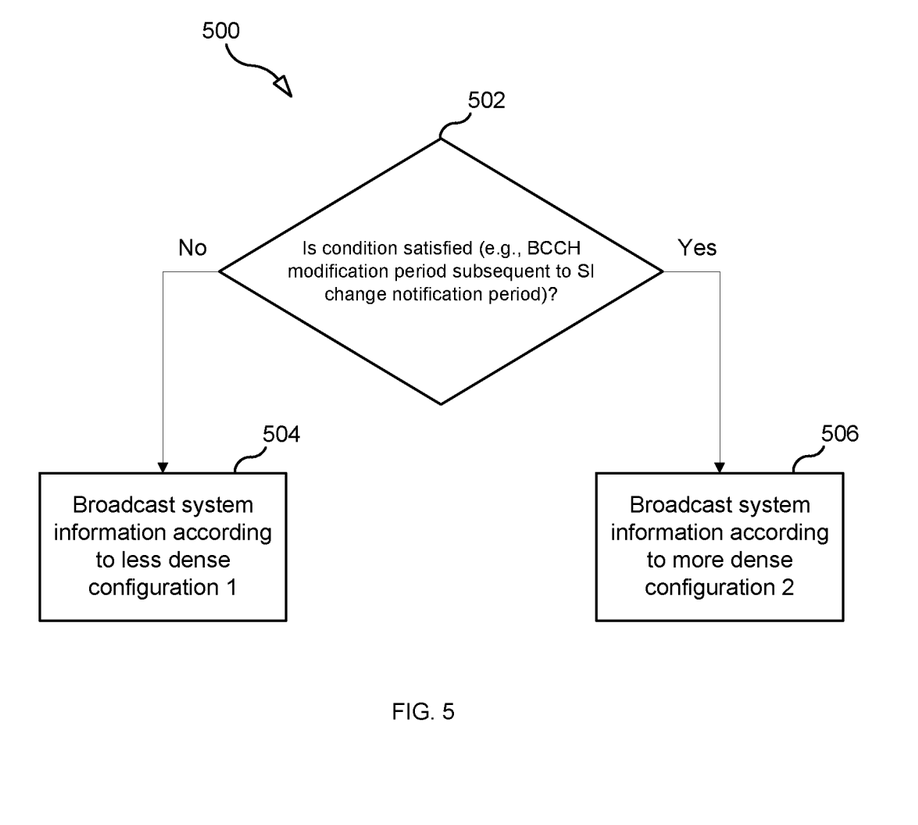
FIG. 5. is a flow chart illustrating a process according to some embodiments.

FIG. 5 illustrates a decision tree 500 according to some embodiments. A decision or determination is made at 502, where it is determined if a condition is satisfied (e.g., condition of whether BCCH modification period is subsequent to SI change notification period). If the condition is not satisfied, then at 504, SI is broadcast according to a less dense first configuration. If the condition is satisfied, then at 506, SI is broadcast according to a more dense second configuration.

Figure 6:
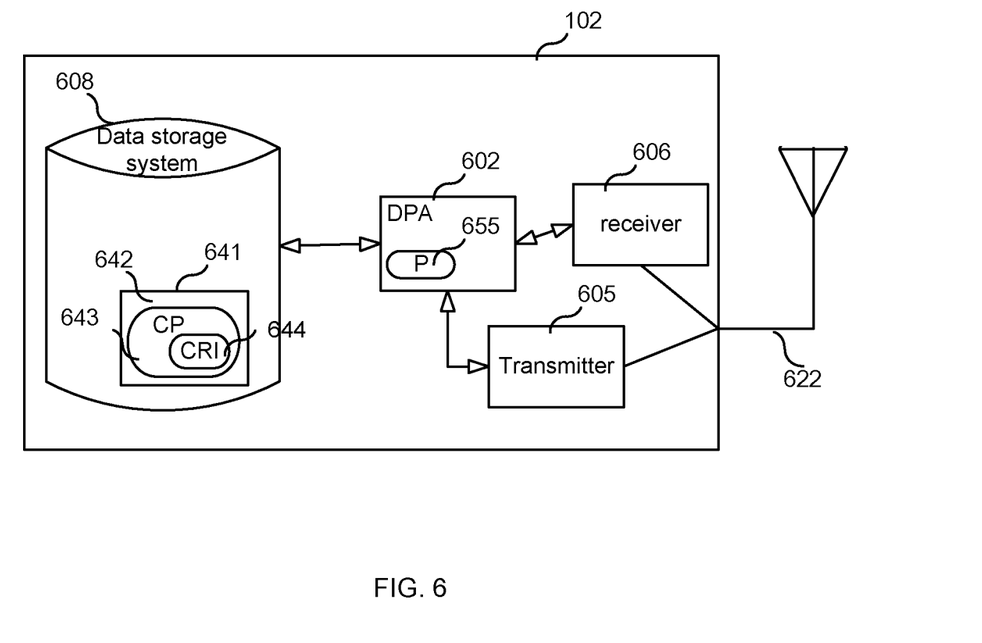
FIG. 6 is a block diagram of a UE according to some embodiments.

FIG. 6 is a block diagram of UE 102 according to some embodiments. As shown in FIG. 6, UE 102 may comprise: a data processing apparatus (DPA) 602, which may include one or more processors (P) 655 (e.g., a general purpose microprocessor and/or one or more other processors, such as an application specific integrated circuit (ASIC), field-programmable gate arrays (FPGAs), and the like); a transmitter 605 and a receiver 604 coupled to an antenna 622 for enabling UE 102 to transmit data to and receive data from an AN node (e.g., base station); and local storage unit (a.k.a., "data storage system") 608, which may include one or more non-volatile storage devices and/or one or more volatile storage devices (e.g., random access memory (RAM)). In embodiments where UE 102 includes a general purpose microprocessor, a computer program product (CPP) 641 may be provided. CPP 641 includes a computer readable medium (CRM) 642 storing a computer program (CP) 643 comprising computer readable instructions (CRI) 644. CRM 542 may be a non-transitory computer readable medium, such as, but not limited to, magnetic media (e.g., a hard disk), optical media, memory devices (e.g., random access memory), and the like. In some embodiments, the CRI 644 of computer program 643 is configured such that when executed by data processing apparatus 602, the CRI causes UE 102 to perform steps described above (e.g., steps described above with reference to the flow charts). In other embodiments, UE 102 may be configured to perform steps described herein without the need for code. That is, for example, data processing apparatus 602 may consist merely of one or more ASICs. Hence, the features of the embodiments described herein may be implemented in hardware and/or software.

Figure 7:
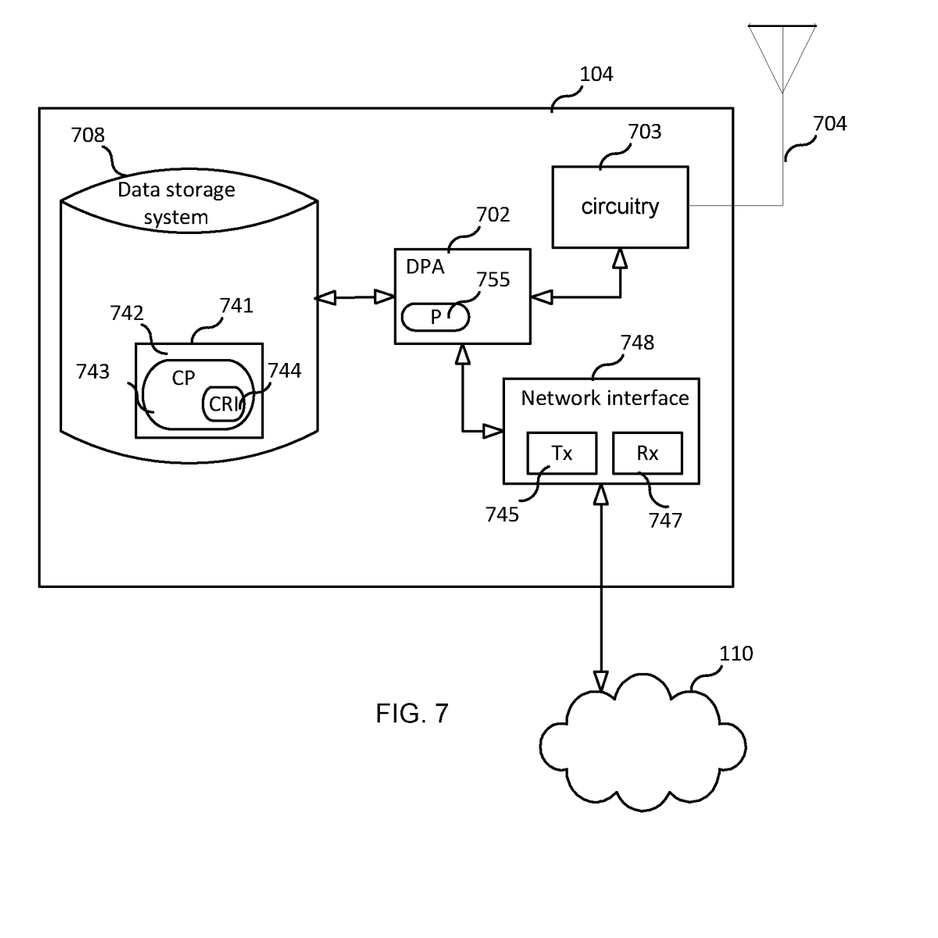
FIG. 7 is a block diagram of a network node according to some embodiments.

FIG. 7 is a block diagram of a network node 104 according to some embodiments. As shown in FIG. 7, node 104 may comprise: a data processing apparatus (DPA) 702, which may include one or more processors (P) 755 (e.g., a general purpose microprocessor and/or one or more other processors, such as an application specific integrated circuit (ASIC), field-programmable gate arrays (FPGAs), and the like); a network interface 748 comprising a transmitter (Tx) 745 and a receiver (Rx) 747 for enabling node 104 to transmit data to and receive data from other nodes connected to a network 110 (e.g., an Internet Protocol (IP) network) to which network interface 748 is connected; circuitry 703 (e.g., radio transceiver circuitry) coupled to an antenna system 704 for wireless communication with UEs); and local storage unit (a.k.a., "data storage system") 708, which may include one or more non-volatile storage devices and/or one or more volatile storage devices (e.g., random access memory (RAM)). In embodiments where node 104 includes a general purpose microprocessor, a computer program product (CPP) 741 may be provided. CPP 741 includes a computer readable medium (CRM) 642 storing a computer program (CP) 743 comprising computer readable instructions (CRI) 744. CRM 742 may be a non-transitory computer readable medium, such as, but not limited to, magnetic media (e.g., a hard disk), optical media, memory devices (e.g., random access memory), and the like. In some embodiments, the CRI 744 of computer program 743 is configured such that when executed by data processing apparatus 702, the CRI causes node 104 to perform steps described above (e.g., steps described above with reference to the flow charts). In other embodiments, node 104 may be configured to perform steps described herein without the need for code. That is, for example, data processing apparatus 702 may consist merely of one or more ASICs. Hence, the features of the embodiments described herein may be implemented in hardware and/or software.

Figure 8:
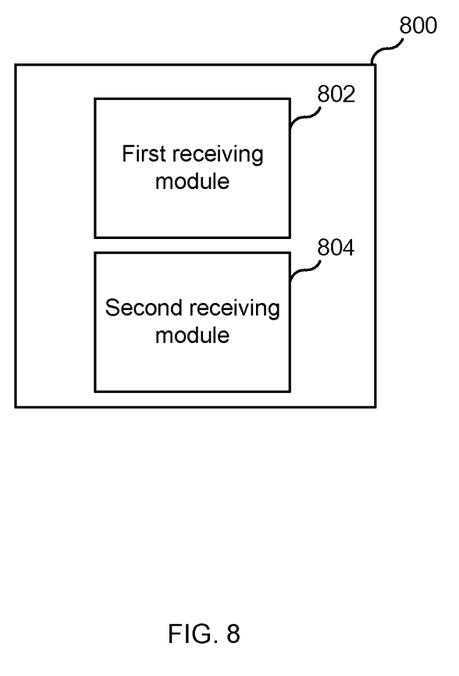
FIG. 8 is a diagram showing functional modules of a user equipment according to some embodiments.

FIG. 8 is a diagram showing functional modules of UE 800 according to some embodiments. As shown in FIG. 8, UE 800 includes a first receiving module 802 and a second receiving module 804. In some embodiments, first receiving module 802 is configured to employ a receiver to receive, during a first time period during which system information (SI) is transmitted by a network node at a first density, a notification that the SI will be transmitted at a second density during an upcoming second time period; and second receiving module 804 is configured to wait, as a result of receiving the notification, until at least the start of the second time period before attempting to obtain the transmitted SI.

Figure 9:
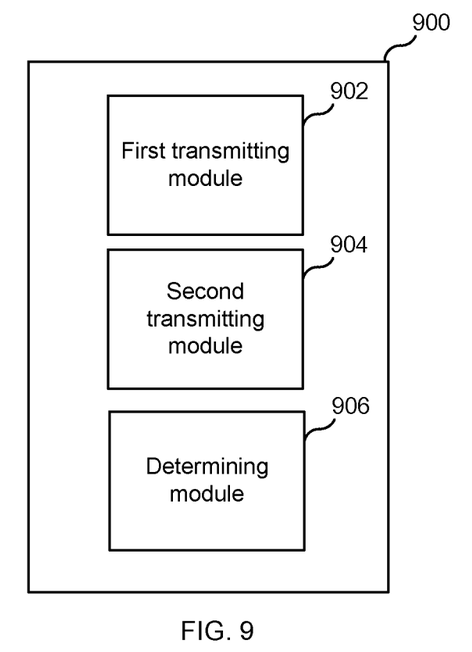
FIG. 9 is a diagram showing functional modules of a network node according to some embodiments.

FIG. 9 is a diagram showing functional modules of a network node 900 according to some embodiments. As shown in FIG. 9, network node 900 includes a first transmitting module 902, a second transmitting module 904, and a determining module 906. In some embodiments, first transmitting module 902 is configured for employing a transmitter to broadcast, during a first time period, system information (SI) at a first density; determining module 906 is configured to determine that a condition is satisfied; and second transmitting module 904 is configured for employing a transmitter to broadcast, as a result of determining that the condition is satisfied, the SI at a second density during a subsequent second time period, wherein the second density is greater than the first density.

While various embodiments of the present disclosure are described herein (including the appendices, if any), it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

ABBREVIATIONS

| Abbreviation | Explanation |
| --- | --- |
| 3GPP | 3rd Generation Partnership Project |
| BCCH | Broadcast Control Channel |
| BI | Backoff Indicator |
| BL | Bandwidth Limited |
| BR | Bandwidth Reduced |
| BSR | Buffer Status Report |
| Cat-M1 | Category M1 |
| Cat-M2 | Category M2 |
| CE | Coverage Enhanced/Enhancement |
| DL | Downlink |
| (e)DRX | (Extended) Discontinuous Reception |
| eMTC | enhanced Machine-Type Communications |
| eNB | Evolved NodeB |
| IoT | Internet of Things |
| LTE | Long-Term Evolution |
| MAC | Medium Access Control |
| NAS | Non-Access Stratum |
| NB-IoT | Narrowband Internet of Things |
| M2M | Machine-to-Machine |
| MIB | Master Information Block |
| MME | Mobility Management Entity |
| MTC | Machine-Type Communications |
| NB | Narrowband |
| (M/N)PDCCH | (MTC/Narrowband) Physical Downlink Control Channel |
| PDU | Protocol Data Unit |
| (N)PRACH | (Narrowband) Physical Random Access Channel |
| PRB | Physical Resource Block |
| PSM | Power Saving Mode |
| PSS | Primary Synchronization Signal |
| RA | Random Access |
| RAPID | Random Access Preamble IDentifier |
| RAR | Random Access Response |
| RNTI | Radio Network Temporary Identifier |
| RRC | Radio Resource Control (protocol) |
| SI | System Information |
| SIB | System Information Block |
| SSS | Secondary Synchronization Signal |
| TBS | Transport Block Size |
| UE | User Equipment |
| UL | Uplink |
| WI | Work Item |

The invention claimed is:

1. A method, performed by a network node, comprising:
during a first time period, broadcasting system information (SI) at a first density;
determining that a condition is satisfied;
as a result of determining that the condition is satisfied, broadcasting the SI at a second density during a subsequent second time period, wherein the second density is greater than the first density,
wherein determining that the condition is satisfied comprises determining that a validity time for a group of UEs will expire during or immediately before the second time period; and
transmitting a SI block (SIB) comprising information indicating one or more of the second density, a duration of the second time period, and the condition to be satisfied.

2. The method of claim 1, wherein the second time period is shorter than the first time period.

3. The method of claim 1, wherein the SI comprises one or more of any of: synchronization signals, MIB/MIB-NB, SIB1-BR/SIB1-NB, or SI-messages.

4. The method of claim 1, wherein:
the method further comprises determining a number of user equipments (UEs) that are expected to read the broadcast SI during the second time period, and
determining that the condition is satisfied comprises determining that the determined number of UEs meets or exceeds a threshold.

5. The method of claim 1, wherein determining that the condition is satisfied comprises determining that there is or has recently been a SI update.

6. The method of claim 1, further comprising notifying UEs in a cell served by the network node about a change in the SI.

7. The method of claim 6, wherein notifying UEs about the change in the SI includes paging the UEs during one BCCH modification period and including a system modification indicator in the paging message indicating that the SI will be updated at the next BCCH modification period boundary.

8. The method of claim 7, wherein the second time period begins at or after the next BCCH modification period boundary.

9. The method of claim 1, wherein a length of the second time period is a function of the coverage enhancement supported by a cell served by the network node and/or the longest acceptable SI acquisition or access latency.

10. The method of claim 1, wherein
broadcasting the SI at the first density during the first time period comprises
transmitting the SI not more than X times during the first time period,
the length of the first time period is t1 seconds,
broadcasting the SI at the second density during the second time period comprises
transmitting the SI at least Y times during the second time period,
the length of the second time period is t2 seconds, and Y/t2 is greater than X/t1,
wherein the X times and Y times is one of 1, 2, 4, 8 and 16.

11. The method of claim 1, wherein
the second time period comprises a plurality of radio frames, and
the information included in the SIB indicates that during the second time period the SI is transmitted once in every nth one of the plurality of radio frames, wherein n is one of 1, 2, 4, 8, and 16.

12. A network node, the network node comprising:
a receiver;
a transmitter;
a data storage system; and
a data processing apparatus comprising a processor, wherein the data processing apparatus is coupled to the data storage system, the transmitter, and the receiver, and the data processing apparatus is configured to:
during a first time period, broadcast system information (SI) at a first density;
determine that a condition is satisfied;
as a result of determining that the condition is satisfied, broadcast the SI at a second density during a subsequent second time period, wherein the second density is greater than the first density, wherein determining that the condition is satisfied comprises determining that a validity time for a group of UEs will expire during or immediately before the second time period; and transmit a SI block (SIB) comprising information indicating one or more of the second density, a duration of the second time period, and the condition to be satisfied.

13. The network node of claim 12, wherein determining that the condition is satisfied comprises determining that a validity time for a group of UEs will expire during or immediately before the second time period.

14. The network node of claim 12, wherein a length of the second time period is a function of the coverage enhancement supported by a cell served by the network node and/or the longest acceptable SI acquisition or access latency.

15. The network node of claim 12, wherein the second time period comprises a plurality of radio frames, and the information included in the SIB indicates that during the second time period the SI is transmitted once in every nth one of the plurality of radio frames, wherein n is one of 1, 2, 4, 8, and 16.

* * * * *